United States Patent [19]

Eremin et al.

[11] 4,113,833

[45] Sep. 12, 1978

[54] PROCESS FOR THE PRODUCTION OF ALUMINA FROM THE MINERAL COMPONENT OF SOLID FUELS

[76] Inventors: Nikolai Ivanovich Eremin, prospekt Elizarova, 20, kv. 28, Leningrad; Semen Alexandrovich Tager, ulitsa Dmitria Ulyanova, 4, korpus 2, kv. 361, Moscow; Vladimir Nikolaevich Kostin, Savvinskaya naberezhnaya, 3, kv. 82, Moscow; Lev Nikolaevich Bobkov, Serpukhovsky val, 5, kv. 152, Moscow; Mikhail Ivanovich Zaitsev, Meierovsky proezd, 30, kv. 11, Moscow; Nikolai Andreevich Kaluzhsky, Vasilievsky Ostrov, Sredny prospekt, 6/13, kv. 123; Nikolai Stepanovich Shmorgunenko, Vasilievsky Ostrov, 1 Linia, 28, kv. 15, both of Leningrad; Abram Zinovievich Jurovsky, ploschad Vosstania, 1, kv. 276, Moscow; Viktor Mikhailovich Kozlov, Gavanskaya ulitsa, 10, kv. 29, Leningrad; Fritiof Meerovich Yakhilevich, Krasnoarmeiskaya ulitsa, 21, kv. 181, Moscow; Mikhail Yakovlevich Shpirt, Teply Stan, 1 mikroraion, korpus 11, kv. 84, Moscow; Vladlen Iosifovich Panin, Leninsky prospekt, 21, kv. 2, Moscow, all of U.S.S.R.

[21] Appl. No.: 702,208

[22] Filed: Jul. 2, 1976

[51] Int. Cl.$^2$ ............................................. C01F 7/18
[52] U.S. Cl. ................................ 423/131; 423/111; 423/115; 423/600; 423/331; 423/138
[58] Field of Search ................ 423/111, 131, 115, 138

[56] References Cited

U.S. PATENT DOCUMENTS

| | | | |
|---|---|---|---|
| 1,891,608 | 12/1932 | Scheidt | 423/131 |
| 2,141,132 | 12/1938 | Folger | 423/131 |
| 2,242,258 | 5/1941 | Noll | 423/131 |
| 2,248,826 | 7/1941 | Seailles et al. | 423/131 |
| 2,351,941 | 6/1944 | Dyckerhoff et al. | 423/131 |
| 2,420,852 | 5/1947 | Archibald | 423/131 |
| 2,544,231 | 3/1951 | Hollum et al. | 423/131 |

FOREIGN PATENT DOCUMENTS

| | | | |
|---|---|---|---|
| 1,168,875 | 4/1964 | Fed. Rep. of Germany | 423/115 |
| 479,293 | 2/1938 | United Kingdom | 423/111 |
| 643,849 | 9/1950 | United Kingdom | 423/131 |

*Primary Examiner*—Herbert T. Carter
*Attorney, Agent, or Firm*—Lackenbach, Lilling & Siegel

[57] ABSTRACT

The invention relates to a process for the production of alumina from mineral component of solid fuels containing aluminum, silicon and iron oxides. The process comprises burning a mixture of a solid fuel with limestone in the following molar ratios of limestone to said oxides: $CaO:SiO_2 = 2.0$, $CaO:Al_2O_3 = 1.3-1.8$, $CaO:Fe_2O_3 = 1.0$, at 1700°–1900° C. As a result, a melt is obtained containing calcium compounds: $2CaO.SiO_2$, $12CaO.7Al_2O_3$, $CaO.Al_2O_3$, $CaO.Fe_2O_3$. The melt is cooled and leached with soda solutions for extracting alumina. The sludge remaining after the leaching is suitable for Portland cement production. The invention enables a considerable enlargement of the range of starting products for aluminum and cement industries due to the use of the mineral component of solid fuels, an about twofold reduction of capital investments in the alumina production and reduction of the fuel consumption by 30–40%.

3 Claims, No Drawings

PROCESS FOR THE PRODUCTION OF ALUMINA FROM THE MINERAL COMPONENT OF SOLID FUELS

The present invention relates to the production of alumina from the non-bauxite non-alkaline starting product, and in particular, to a process for the production of alumina from the mineral component of solid fuels.

The invention may be used in non-ferrous metallurgy in the production of alumina and aluminum, as well as in comprehensive processing of secondary mineral starting products such as the mineral component of coals, shales and turfs.

It is known to produce alumina from ash recovered in purification devices of thermal power plants operating with a solid fuel.

Ash containing aluminum, silicon and iron oxides is taken from purification devices of a power plant and conveyed to a shop for preparing a mixture thereof with limestone. The ash is mixed with limestone in the following ratios of limestone to the oxides of the ash: $CaO:SiO_2=2.0$, $CaO:Al_2O_3=1.3-1.8$, $CaO:Fe_2O_3=1.0$.

Then the resultant mixture is sintered at 1375°–1425° C in rotary kilns heated with natural gas or fuel oil.

As a result, a product in the form of a cake is obtained which contains calcium compounds $2CaO.SiO_2$, $12CaO.7Al_2O_3$, $CaO.Al_2O_3$, $CaO.Fe_2O_3$.

Then the cake is cooled in special cooling apparatus. The cooling is effected in two stages to obtain a spontaneously loosening product: first, at 1300° C at a rate of 6° per minute, and then at ambient air temperature at any appropriate rate.

The cooled cake in the form of a powder is leached with soda solutions in reactors with stirrers for extracting alumina.

The disadvantage of the known process reside in a low temperature heat treatment, hence a low rate of reaction of CaO with oxides of the ash. The reaction of the above-mentioned components occurs in solid phase. Therefore, the process of heat treatment takes several hours.

It is an object of the invention to provide a process for the production of alumina from the mineral component of solid fuels which enables an acceleration of the heat treatment process due to an increased rate of reaction of CaO and oxides of the mineral component of solid fuels.

This and other objects are accomplished by a process for the production of alumina from the mineral component of solid fuels containing aluminum, silicon and iron oxides, comprising the steps of heat treatmemnt of a mixture of said mineral component of solid fuel with limestone with the following ratios of limestone to said oxides: $CaO:SiO_2=2.0$, $CaO:Al_2O_3=1.3-1.8$, $CaO:Fe_2O_3=1.0$, with subsequent cooling of the resultant product containing calcium compounds $2CaO.SiO_2$, $12CaO.7Al_2O_3$, $CaO,Al_2O_3$, $CaO.Fe_3O_3$ in two stages, whereafter the cooled product is leached to extract alumina. In accordance with the invention, the heat treatment of the mixture of mineral component of solid fuels and limestone is effected during the burning of the solid fuels in a mixture with limestone at 1700°–1900° C to obtain a product in the form of a melt containing said calcium compounds.

Directly burning a mixture of solid fuel and limestone at 1700°–1900° C and obtaining a product in the form of a melt containing calcium compounds enable the reaction of lime and oxides of mineral component of the solid fuels in liquid phase so that the rate of reaction is increased by scores of times as compared to the known process, wherein the reaction occurs in a solid phase.

In order to reduce the quantity of inert matter fed during the burning, 7-20 w.% of limestone are preferably added to a solid fuel, the remaining 93–80 w.% being added to the melt.

The process for the production of alumina from the mineral component of solid fuels is preferably carried out in the following manner.

Coal, shale and turf for burning in thermal power plants are selected to contain, in the mineral component thereof, the following oxides: $SiO_2$, $Fe_2O_3$, $Al_2O_3$. This fuel is mixed with limestone based on the following molar ratios of limestone to said oxides: $CaO:Al_2O_3=1.3-1.8$, $CaO:SiO_2=2.0$, $CaO:Fe_2O_3=1.0$, and the resultant mixture is comminuted into a pulverulent form.

Then the mixture is burnt at 1700°–1900° C. During the burning, the above-mentioned temperature is attained resulting in decarbonization of limestone and a reaction of the resultant CaO with oxides of the mineral component of solid fuel in a melt which is formed at such elevated temperatures. As a result the following calcium compounds are formed: $2CaO.SiO_2$, $12CaO.7Al_2O_3$, $CaO.Al_2O_3$, $CaO.Fe_2O_3$.

Therefore, a direct production of a homogeneous melt having a predetermined minerological and chemical composition is insured.

Burning the mixture of solid fuel and limestone is preferably effected in vertical combustion chambers with liquid slag removal.

The removal of melt from the combustion chamber is insured where the temperature of fuel combustion products, that is the heat treatment temperature, is higher than the temperature of the fluid melt, that is the temperature of the liquid state of the melt.

With the addition of 100% of limestone, calcium compounds in the form of a melt containing about 53–56% of CaO are formed. The temperature of the liquid is about 1600° C. Accordingly, burning is effected at 1900° C.

The resultant melt of a predetermined composition is cooled in two stages to provide for obtaining a self-loosening product: the first stage — to 1300° C at a rate of 6° per minute, and the second stage — from 1300° C to ambient air temperature — at a rate of 10°–12° per minute.

During the cooling, dicalcium silicate contained in the product is converted from β-modification into γ-modification, whereby it spontaneously loosens into a fine powder due to expansion of the product by about 10%. The powder is leached by an appropriate known method with soda solutions for extracting alumina. The sludge remaining after the leaching contains mainly dicalcium silicate and may be used as a good starting product for the production of Portland cement.

Where ash content of a solid fuel is above 30%, in order to reduce the amount of inert matter fed into the combustion chamber, a part of limestone is preferably added to the solid fuel, e.g. from 7 to 20 w.%. In this case, the melt contains about 40% of CaO, and the temperature of the liquid state thereof is about 1500° C. This facility enables lowering the burning temperatures of solid fuel to 1700° C.

The remaining part of limestone required, that is 93–80 w.% of limestone is added directly to the melt after the combustion chamber so as to maintain the required ratios of calcium oxide to oxides of the mineral component in the final product.

The advantage of the process according to the invention consists in that the heat treatment is conducted at 1700°–1900° C during the burning of solid fuel. Thus, two steps of the process are combined: burning and heat treatment, whereby the reaction of CaO with oxides of the mineral component of a solid fuel occurs in liquid phase for several seconds. The above oxides intensively react with each other in the resultant melt.

Fuel consumed during the burning for producing power is concurrently used for the heat treatment.

The present invention enables an enlargement of the range of starting products for the production of alumina, about twofold reduction of capital investment in the alumina production, and lowering of fuel consumption for producing alumina by 30–40%, while eliminating accumulation of ash in thermal power plants and enabling a lateral production of Portland cement from sludges of the alumina production.

In addition, with the use of the present invention, the problem of comprehensive utilization of secondary mineral starting products is solved, and pollution of the environment with noxious dust from thermal power plants is eliminated.

Burning a mixture of a solid fuel with limestone also permits reducing pollution of the environment with noxious gases, including sulphur and nitrogen oxides, because it is common knowledge that limestone is a good adsorbent of these noxious oxides and is specially used for decontamination purposes.

The invention will be better understood from the following specific examples of the process of the invention.

EXAMPLE 1

Limestone was added to coal having mineral components containing in w.%: $SiO_2$ — 31.2, $Al_2O_3$ — 13.2, $Fe_2O_3$ — 18.2, CaO — 32.2, with a moisture content of 39% and an ash content of 8.52%, in the following molar ratios to the oxides of the mineral component of the coal: $CaO:SiO_2=2.0$, $CaO:Al_2O_3=1.55$, $CaO:Fe_2O_3=1.0$.

The resultant mixture was comminuted into a pulverulent form and burnt at 1900° C in a boiler unit with liquid slag removal. During the burning, a melt containing calcium compounds $2CaO.SiO_2$, $12CaO.7Al_2O_3$, $CaO.Al_2O_3$, $CaO.Fe_2O_3$ was formed having the following composition in w.%: $SiO_2$ — 21.4, $Al_2O_3$ — 8.7, $Fe_2O_3$ — 11.3, CaO — 53.3.

The melt temperature was about 1600° C. The melt was cooled in two stages: from 1600° to 1300° C at a rate of 6° per minute, and then to ambient air temperature at a rate of 10°–12° per minute to provide for spontaneous loosening of the product into power (97–98% finer than 0.147 mm) due to the conversion of dicalcium silicate from $\beta$-modification into $\gamma$-modification. The total annual consumption of coal is 5494 thousand tons, the amount of limestone to be added to coal — 440 thousand tons.

The amount of cooled product from annual burning of 5834 thousand tons of the mixture is 598 thousand tons.

The annual yield of alumina after the leaching of the resultant power with soda solutions is 44 thousand tons.

EXAMPLE 2

A part of limestone, that is 20% of the total amount required due to an elevated ash content was added to shale having mineral components containing in w.%: $SiO_2$ — 34.2, $Al_2O_3$ — 9.4, $Fe_2O_3$ — 7.8, CaO — 44.1, with a moisture content 11.5% and an ash content 44.25%, to obtain the following molar ratios of CaO to the oxides of mineral component: $CaO:SiO_2=2.0$, $CaO:Al_2O_3=1.55$; $CaO:Fe_2O_3=1.0$.

The resultant mixture was comminuted into powder and burnt at 1700° C in a boiler unit with liquid slag removal.

During the burning, a melt at 1500° C was formed containing an insufficient amount of CaO which was completed by adding 80 w.% of limestone directly to the melt after the boiler unit in melt accumulating ladles. As a result of reactions, a melt containing calcium compounds $2CaO.SiO_2$, $12CaO.7Al_2O_3$, $CaO.Al_2O_3$ and $CaO.Fe_2O_3$ was obtained having the following composition in w.%: $SiO_2$ — 25.8, $Al_2O_3$ — 7.2, $Fe_2O_3$ — 5.8, CaO — 56.8, at about 1400° C.

The melt was cooled from 1400° to 1300° C at a rate of 6° per minute and then to ambient air temperature at a rate of 10°–12° per minute which resulted in obtaining a spontaneously loosening final product forming a fine powder due to the conversion of dicalcium silicate from $\beta$-modification into $\gamma$-modification.

Total annual consumption of shale is 11060 thousand tons, amount of limestone to be added to shale — 3740 thousand tons.

Annual production of the cooled product is 6650 thousand tons, and the annual yield of alumina is 398 tons.

The data of Examples 3, 4 and 5 are given in the Table.

EXAMPLE 6

To coal having a mineral component containing in w.%: $SiO_2$ 48.0, $Al_2O_3$ — 39.9, $Fe_2O_3$ — 5.4, CaO — 4.4, with a moisture content of 21.5% and an ash content of 30.22%, only a part of limestone was added due to an elevated content of ash and aluminum oxide imparting an elevated refractoriness to mineral component, that is 15 w.% of the total amount of limestone required to obtain the following molar ratios of CaO to the oxides of mineral component of the coal in the final product: $CaO:SiO_2=2.0$, $CaO:Al_2O_3=1.55$, $CaO:Fe_2O_3=1.0$.

Table

| Denomination | Examples | | |
|---|---|---|---|
| | 3 | 4 | 5 |
| Solid fuel | turf | coal | coal |
| Moisture content, % | 34.5 | 7.5 | 32.5 |
| Ash content, % | 13.1 | 18.5 | 23.0 |
| Composition of mineral component of solid fuel w. % | | | |
| $SiO_2$ | 33.9 | 54.6 | 58.2 |
| $Al_2O_3$ | 22.4 | 25.4 | 37.6 |
| $Fe_2O_3$ | 15.5 | 14.7 | 8.0 |

Table-continued

| Denomination | Examples 3 | 4 | 5 |
|---|---|---|---|
| CaO | 25.3 | 2.8 | 5.4 |
| Annual consumption of solid fuel, thousand tons | 5350 | 3150 | 8700 |
| Annual consumption of limestone, thousand tons | 1030 | 1680 | 5690 |
| Oxide ratios: | $CaO:SiO_2 = 2.0$, | $CaO:Al_2O_3 = 1.55$, | $CaO:Fe_2O_3 = 1.0$ |
| Burning temperature, °C | 1900 | 1900 | 1900 |
| Melt composition w. % | | | |
| $SiO_2$ | 20.5 | 23.6 | 21.6 |
| $Al_2O_3$ | 12.8 | 10.4 | 15.6 |
| $Fe_2O_3$ | 8.9 | 6.4 | 3.8 |
| CaO | 53.8 | 56.0 | 55.0 |
| Melt temperature, °C | 1600 | 1600 | 1600 |
| Annual yield of melt, thousand tons | 1160 | 1410 | 4750 |
| Annual yield of alumina, thousand tons | 123 | 120 | 488 |

The resultant mixture was comminuted into a pulverulent form and burnt in a boiler unit with liquid slag removal at 1800° C.

During the burning, a melt at 1600° C was formed, to which the remaining part of limestone was added, that is 85 w.% of the total amount required.

As a result, a melt was obtained containing the following compounds $2CaO.SiO_2$, $12CaO.7Al_2O_3$, $CaO.Al_2O_3$ $CaO.Fe_2O_3$ and having the following composition in w.%: $SiO_2$ — 21.7, $Al_2O_3$ — 16.4, $Fe_2O_3$ — 2.7, CaO — 55.8, at 1400° C.

The melt was cooled to 1300° C at a rate of 6° per minute and then to ambient air temperature at a rate of 10°-12° C per minute so that the cooled product spontaneously loosened into fine powder due to the conversion of dicalcium silicate from β-modification into γ-modification.

Total annual consumption of coal in this example is 9640 thousand tons, amount of limestone to be added to coal — 8350 thousand tons, annual yield of cooled melt — 7000 thousand tons, and the annual yield of alumina extracted by leaching with soda solutions — 964 thousand tons.

EXAMPLE 7

To coal having mineral component containing in w.%: $SiO_2$ — 64.5, $Al_2O_3$ — 27.5, $Fe_2O_3$ — 4.5, CaO — 1.6, with a moisture content 8% and ash content 35.88%, only a part of limestone was added due to a high ash content and refractoriness of ash, that is 7 w.% of the total amount of limestone required to obtain the following molar ratios of the CaO to the oxides of mineral component in the final product: $CaO:SiO_2 = 2.0$, $CaO:Al_2O_3 = 1.55$, $CaO:Fe_2O_3 = 1.0$.

The resultant mixture was comminuted into a pulverulent form and burnt at 1900° C in a boiler unit with liquid slag removal.

During the burning, a melt at 1600° C was formed, to which the remaining 93 w.% of limestone (of the total amount thereof) were added.

As a result of reactions, a melt was obtained containing the following calcium compounds: $2CaO.SiO_2$, $12CaO.7Al_2O_3$, $CaO.Al_2O_3$, $CaO.Fe_2O_3$ with the following chemical composition in w.%: $SiO_2$ — 25.8, $Al_2O_3$ — 10.5, $Fe_2O_3$ — 2.3, CaO — 58.2, at 1400° C.

The melt was cooled to 1300° C at a rate of 6° per minute and then to ambient air temperature at a rate of 10°-12° per minute to obtain a spontaneously loosening product in the form of a fine powder due to the conversion of dicalcium silicate from β-modification into δ-modification.

As a result of leaching of the powder with soda solutions, alumina was extracted.

Total annual consumption of coal in this example is 5685 thousand tons, amount of limestone to be added to coal — 6950 thousand tons. Annual yield of the cooled product is 5450 thousand tons, annual yield of alumina — 488 thousand tons.

What is claimed is:

1. A process for the production of alumina directly from solid fuels containing aluminum, silicon and iron oxides during the burning of said fuels, comprising mixing the solid fuel with limestone with the following molar ratios of limestone and said oxides: $CaO:SiO_2 = 2.0$, $CaO:Al_2O_3 = 1.3-1.8$, $CaO:Fe_2O_3 = 1.0$; burning the resultant mixture at about 1700°-1900° C to obtain a product containing calcium compounds $2CaO.SiO_2$, $12CaO.7Al_2O_3$, $CaO.Al_2O_3$, $CaO.Fe_2O_3$ in the form of a melt; cooling the resultant melt to 1300° C at a rate of about 6° C per minute, and from 1300° C to ambient temperature to convert dicalcium silicate contained in the product from the beta-modification to the gamma-modification and leaching the cooled product with a soda solution to extract alumina, leaving a sludge consisting essentially of dicalcium silicates.

2. The process of claim 1, wherein 7 to 20 weight % of the total limestone is added to the solid fuel prior to burning, and the remaining 80 to 93 weight % is added to the melt.

3. The process of claim 1, wherein the cooling from 1300° C to ambient temperature is conducted at a rate of about 10° to 12° C per minute.

* * * * *